US012086359B2

(12) United States Patent
Gao et al.

(10) Patent No.: US 12,086,359 B2
(45) Date of Patent: Sep. 10, 2024

(54) ELECTRONIC APPARATUS AND DATA PROCESSING METHOD

(71) Applicant: Lenovo (Beijing) Limited, Beijing (CN)

(72) Inventors: Ying Gao, Beijing (CN); Xiaoren Cheng, Beijing (CN); Zhou Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 71 days.

(21) Appl. No.: 17/615,544

(22) PCT Filed: May 28, 2020

(86) PCT No.: PCT/CN2020/092936
§ 371 (c)(1),
(2) Date: Nov. 30, 2021

(87) PCT Pub. No.: WO2020/239029
PCT Pub. Date: Dec. 3, 2020

(65) Prior Publication Data
US 2022/0236827 A1 Jul. 28, 2022

(30) Foreign Application Priority Data

May 31, 2019 (CN) .......................... 201910472199.0
May 31, 2019 (CN) .......................... 201910472214.1

(51) Int. Cl.
*G06F 3/041* (2006.01)
*G06F 3/04883* (2022.01)
(52) U.S. Cl.
CPC .......... *G06F 3/0418* (2013.01); *G06F 3/0412* (2013.01); *G06F 3/04883* (2013.01); *G06F 2203/04101* (2013.01)

(58) Field of Classification Search
CPC .. G06F 3/0418; G06F 3/0412; G06F 3/04883; G06F 2203/04101
(Continued)

(56) References Cited

U.S. PATENT DOCUMENTS

2008/0168403 A1* 7/2008 Westerman ........... G06F 3/0488
715/863
2009/0143141 A1* 6/2009 Wells .................. G07F 17/3239
463/37
(Continued)

FOREIGN PATENT DOCUMENTS

CN 105637467 A 6/2016
CN 105980974 A 9/2016
(Continued)

OTHER PUBLICATIONS

The World Intellectual Property Organization (WIPO) International Search Report for PCT/CN2020/092936 Aug. 26, 2020 7 pages (including translation).

*Primary Examiner* — Kwin Xie
(74) *Attorney, Agent, or Firm* — ANOVA LAW GROUP, PLLC

(57) ABSTRACT

Embodiments of the present disclosure provides an electronic apparatus and a data processing method. The electronic apparatus includes a first sensor (101), configured to collect a distance sensing parameter, and a second sensor (102), configured to collect a touch control sensing parameter. A touch control area of the second sensor (102) covers a specific area of a first surface of the electronic apparatus. The first sensor collects the distance sensing parameter in a space above the touch control sensing area. The distance sensing parameter may be collected in the space above the touch control sensing area by arranged a distance sensor. Thus, the electronic apparatus may realize a touch control (Continued)

input and an input through the distance, which enriches input manners of the electronic apparatus and improves the user experience.

19 Claims, 15 Drawing Sheets

(58) Field of Classification Search
USPC .................................................. 345/173–174
See application file for complete search history.

(56) References Cited

U.S. PATENT DOCUMENTS

| | | | | |
|---|---|---|---|---|
| 2013/0328828 | A1* | 12/2013 | Tate | G06F 3/041662 |
| | | | | 345/174 |
| 2014/0118276 | A1 | 5/2014 | Chiu et al. | |
| 2014/0368455 | A1* | 12/2014 | Croisonnier | G06F 3/045 |
| | | | | 345/173 |
| 2015/0370384 | A1* | 12/2015 | Park | G06F 3/0446 |
| | | | | 345/174 |
| 2017/0192493 | A1* | 7/2017 | Ofek | G06F 3/04883 |
| 2017/0255318 | A1* | 9/2017 | Mese | G06F 3/017 |

FOREIGN PATENT DOCUMENTS

| | | |
|---|---|---|
| CN | 106527804 A | 3/2017 |
| CN | 109710119 A | 5/2019 |
| CN | 110187795 A | 8/2019 |
| CN | 110187796 A | 8/2019 |

* cited by examiner

ELECTRONIC APPARATUS AND DATA PROCESSING METHOD

CROSS-REFERENCE TO RELATED APPLICATIONS

This application is a national phase entry under 35 U.S.C. § 371 of International Application No. PCT/CN2020/092936, filed on May 28, 2020, which claims priority to Chinese Application No. 201910472199.0 filed May 31, 2019, and Chinese Application No. 201910472214.1 filed May 31, 2019, the entire contents of all of which are incorporated herein by reference.

TECHNICAL FIELD

The present disclosure generally relates to the terminal technology field and, more particularly, to an electronic apparatus and a data processing method.

BACKGROUND

A laptop apparatus usually is provided with a touch control area. However, a user can only stroke a keyboard or perform a touch input, such as click or slide, in the touch control area to realize a touch control operation, which leads to a single input mode and poor user experience. For example, currently, a touchpad is usually arranged at a center position below the keyboard to implement a touchpad function. However, the touchpad of the laptop can only implement a touch control function, which leads to a single way of responding to an input operation and cannot provide the user with more input experience.

SUMMARY

The present disclosure provides an electronic apparatus, including:
a first sensor, configured to collect a distance sensing parameter;
a second sensor, configured to collect a touch control sensing parameter;
wherein a touch control sensing area of the second sensor covers a specific area of a first surface of the electronic apparatus, and the first sensor can collect the distance sensing parameter in a space above the touch control sensing area.

In the above electronic apparatus, preferably, the first sensor is arranged at a position of a window of a circuit board of the second sensor, and the first sensor collects the distance sensing parameter in the space above the touch control sensing area through the window.

In the above electronic apparatus, preferably, the window is arranged at a middle position of the first edge of the circuit board.

The above electronic apparatus, preferably, further includes:
a protection structure laid on a surface of the second sensor and covering the first sensor;
wherein the first sensor can collect the distance sensing parameter through the protection structure.

The above electronic apparatus, preferably, further includes:
a processor, configured to generate an operation instruction based on the distance sensing parameter and the touch control sensing parameter and respond to the operation instruction to execute a corresponding function.

In the above electronic apparatus, preferably, the processor being configured to generate the operation instruction based on the distance sensing parameter and the touch control sensing parameter specifically includes:
recognizing a gesture type of an operation based on the distance sensing parameter;
if the gesture type is a first type, generating the instruction corresponding to the first type;
if the gesture type is a second type, processing the touch control parameter using the distance sensing parameter and generating the operation instruction based on a processed touch control sensing parameter.

The present disclosure further provides a data processing method, including:
responding to a distance sensing parameter collected by a first sensor and a touch control sensing parameter collected by a second sensor;
wherein a touch control sensing area of the second sensor covers a specific area of a first surface of an electronic apparatus, and the first sensor can collect the distance sensing parameter in the space above the touch control sensing area;
generating an operation instruction based on the distance sensing parameter and the touch control sensing parameter; and
responding to the operation instruction to execute a corresponding function.

In the above method, preferably, the first sensor is arranged at a position of a window of a circuit board of the second sensor; and wherein generating the operation instruction based on the distance sensing parameter and the touch control sensing parameter includes:
recognizing a gesture type of an operation based on the distance sensing parameter;
if the gesture type is a first type, generating the instruction corresponding to the first type;
if the gesture type is a second type, processing the touch control parameter using the distance sensing parameter and generating the operation instruction based on a processed touch control sensing parameter.

In the above method, preferably, processing the touch control sensing parameter includes:
setting a parameter in the touch control sensing parameter corresponding to the position of the window as a target parameter.

In the above method, preferably, the target parameter corresponds to the parameter in the touch control sensing parameter corresponding to a position adjacent to the window.

It can be seen from the above technical solutions that, in the electronic apparatus and the data processing method disclosed in the present disclosure, by arranging the first sensor capable of collecting the distance sensing parameter on the electronic apparatus, the first sensor can collect the distance sensing parameter in the space above the touch control sensing area of the second sensor. It can be seen that, in the present disclosure, by arranging a distance sensor to collect the distance sensing parameter in the space above the touch control sensing area, the electronic apparatus may realize touch control input and input through the distance sensor. Thus, the input manner of the electronic apparatus is enriched, which improves the user experience.

The present disclosure further provides a data processing method, including:

receiving a first parameter of a first sensor;
determining a method of response of a second sensor in a sensing area of the second sensor at least based on the first parameter;
wherein the second sensor responds to an input operation in the sensing area.

In the above method, preferably, determining the method of response of the second sensor in the sensing area of the second sensor at least based on the first parameter includes:
determining a response zone in the sensing area based on the first parameter, the second sensor responding to the input operation with the response zone;
wherein other areas except the response zone in the sensing area are configured to be prohibited from responding to the input operation.

In the above method, preferably, determining the response zone in the sensing area based on the first parameter includes:
recognizing a position parameter of an operating body in the first parameter;
determining a mapping area where the operating body is mapped to the sensing area based on the position parameter; and
determining the response zone in the sensing area based on the mapping area.

In the above method, preferably, determining the response zone in the sensing area includes:
if an of the mapping area is greater than or equal to a preset threshold, determining other areas in the sensing area except the mapping area as the response zone, the mapping area being configured to be prohibited from responding to the input operation; and
if the area of the mapping area is smaller than the threshold, based on a distribution position of the mapping area in the sensing area, determining the response zone in the sensing area.

In the above method, preferably, determining the response zone in the sensing area includes:
determining a zone corresponding to the distribution position of the mapping area in the sensing area as the response zone in a plurality of zones of the sensing area;
wherein other zones except the response zone in the sensing area are configured to be prohibited from responding to the input operation.

In the above method, preferably, determining the method of response of the second sensor in the sensing area of the second sensor at least based on the first parameter includes:
outputting a response mark in a display area corresponding to the sensing area based on the first parameter, the second sensor responding to the input operation with the response mark.

In the above method, preferably, outputting the response mark in the display area corresponding to the sensing area based on the first parameter includes:
recognizing the position parameter of the operating body in the first parameter;
determining the mapping area of the operating body where the operating body is mapped to the sensing area based on the position parameter; and
outputting the response mark in the corresponding display area based on the mapping area.

In the above method, preferably, outputting the response mark in the display area corresponding to the sensing area based on the mapping area includes:
determining the display area associated with the mapping area; and
outputting the response mark in the display area, the display area associating to a relative position of the mapping area in the sensing area.

The present disclosure further provides an electronic apparatus, including:
a first sensor, configured to collect a first parameter; and
a second sensor including a sensing area;
wherein the second sensor is configured to determine a method of response of the second sensor in the sensing area at least based on the first parameter, and the second sensor responding to an input operation in the sensing area.

In the electronic apparatus, preferably, the first sensor is arranged at a position of a window of a circuit board of the second sensor, and the first sensor can collect the first parameter through the window.

In the electronic apparatus, preferably, the first sensor is a distance sensor, and the second sensor is a touch control sensor;
wherein the sensing area of the second sensor covers a specific area of a first surface of the electronic apparatus, and the first sensor can collect the first parameter in a space above the sensing area.

In the electronic apparatus, preferably, the window is arranged at a middle position of a first edge of the circuit board of the second sensor.

It can be seen from the above technical solutions that, in the data processing method and electronic apparatus disclosed in the present disclosure, after receiving the first parameter of the first sensor, the method of response of the second sensor is determined in the sensing area of the second sensor based on the first parameter. As such, the second sensor responds to the input operation in the sensing area in the determined method of response. It can be seen that, in the present disclosure, based on the change or difference of the first parameter, the second sensor responds to the input operation in the sensing area of the second in a corresponding method of response. Thus, the electronic apparatus provides a variety of method of responses for the input operation of the user, which improves the user experience.

BRIEF DESCRIPTION OF THE DRAWINGS

To more clearly describe the technical solutions in embodiments of the present disclosure or the prior art, the drawings that need to be used in the description of embodiments or the prior art are briefly introduced below. Obviously, the drawings in the following description are only some embodiments of the present disclosure. For those of ordinary skill in the art, other drawings can be obtained according to these drawings without creative effort.

DETAILED DESCRIPTION OF THE EMBODIMENTS

The technical solutions of embodiments of the present disclosure are described clearly and completely in connection with the accompanying drawings in embodiments of the present disclosure below. Obviously, the described embodiments are only a part of embodiments of the present disclosure rather than all the embodiments. Based on embodiments of the present disclosure, all other embodiments obtained by those of ordinary skill in the art without creative effort shall be within the scope of the present disclosure.

Figure 1:
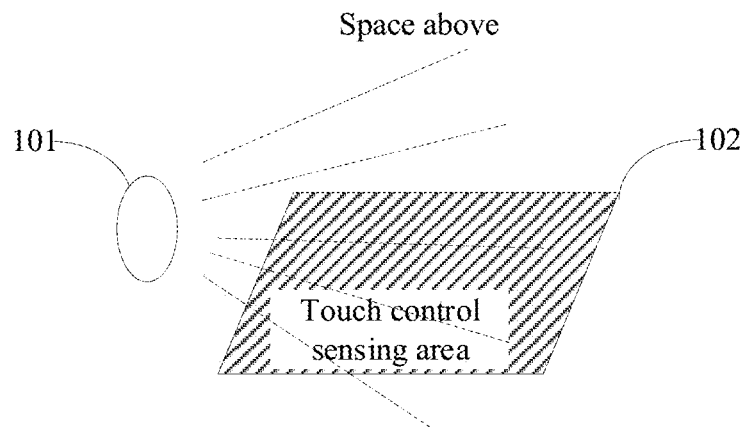
FIG. 1 illustrates a schematic structural diagram of an electronic apparatus according to embodiment one of the present disclosure.

FIG. 1 illustrates a schematic structural diagram of an electronic apparatus according to embodiment one of the present disclosure. The electronic apparatus may include an apparatus, such as a laptop or a computer, having a touch control function.

Specifically, the electronic apparatus of the embodiment includes the following structure.

A first sensor 101 is configured to collect a distance sensing parameter.

The first sensor 101 may be a distance sensor and be configured to collect the distance sensing parameter of an object in a specific space. The distance sensing parameter may be used to detect a status parameter of the object, such as a distance, a position, and an attitude.

The second sensor 102 is configured to collect a touch control sensing parameter.

The second sensor 102 may be a touch control sensor and configured to collect the touch control sensing parameter in the touch control sensing area. The touch control sensing parameter may be used to detect a position and trajectory of a touch control operation.

Figure 2:
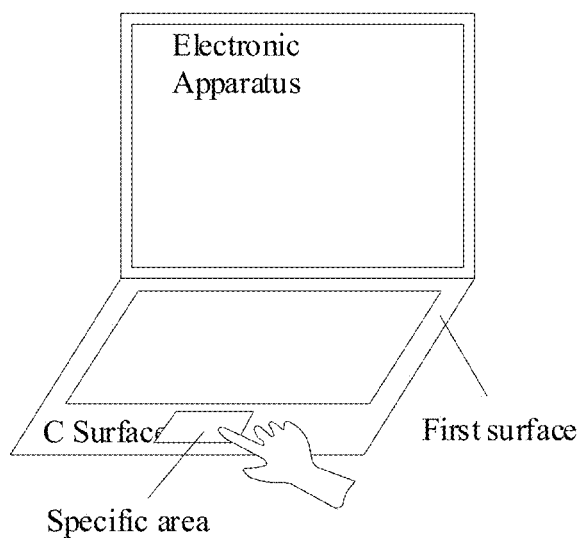
FIG. 2 and FIG. 3 illustrate schematic diagrams of application examples according to the embodiment of the present disclosure.

In the embodiment, the touch control sensing area of the second sensor 102 may cover a specific area of a first surface of the electronic apparatus. The specific area may include an area for facilitating the user to perform the touch control operation. As shown in FIG. 2, an area below the keyboard of the laptop is the touch control sensing area. The user may perform touch action in the touch control sensing area to realize a touch control input.

Figure 3:
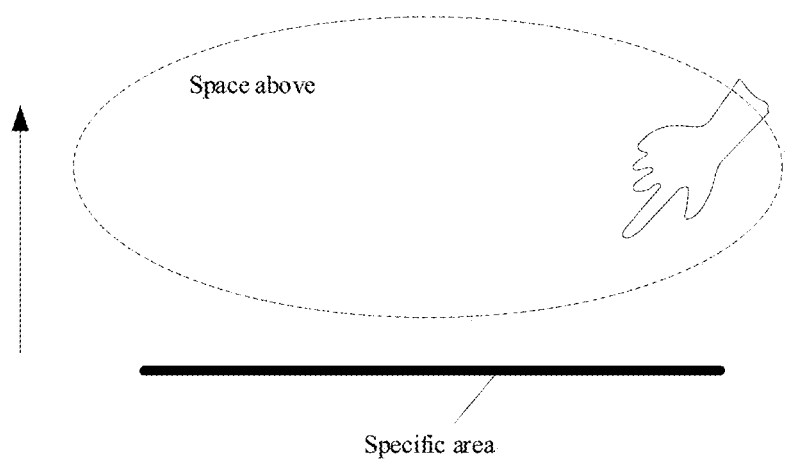

Based on this, the first sensor 101 in the embodiment is arranged at a position of the electronic apparatus corresponding to the second sensor 102, so that the first sensor 101 can collect a distance sensing parameter in a space above the touch control sensing area. As shown in FIG. 3, the touch control sensing area of the second sensor 102 is the specific area below the keyboard of the laptop. The first sensor 101 can collect the distance sensing parameter of the object appearing in the space above the specific area.

It can be seen from the above technical solutions that, in the electronic apparatus of the embodiment one of the present disclosure, by arranging the first sensor capable of collecting the distance sensing parameter on the electronic apparatus, the first sensor can collect the distance sensing parameter in the space above the touch control sensing area of the second sensor. Thus, in the embodiment, by arranging the distance sensor to collect the distance sensing parameter in the space above the touch control sensing area, the electronic apparatus may realize the touch control input and the input through the distance sensor. Thus, the input manner of the electronic apparatus may be enriched, which improves the user experience.

Figure 4:
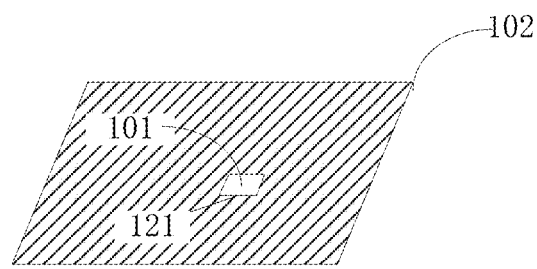
FIG. 4 to FIG. 7 illustrate schematic diagrams of other structures according to the embodiment of the present disclosure.

In an embodiment, the first sensor 101 may be arranged at a position of the window 121 of the circuit board of the second sensor 102. As shown in FIG. 4, the window is arranged at a specific position on the circuit board of the second sensor 102. The first sensor 101 is arranged at the position of the window 121. Thus, the first sensor 101 can collect the distance sensing parameter in the space above the touch control sensing area of the second sensor 102 through the window 121, and the situation of not realizing the parameter collection will not occur due to the shielding of the housing of the electronic apparatus or other structures.

Figure 5:
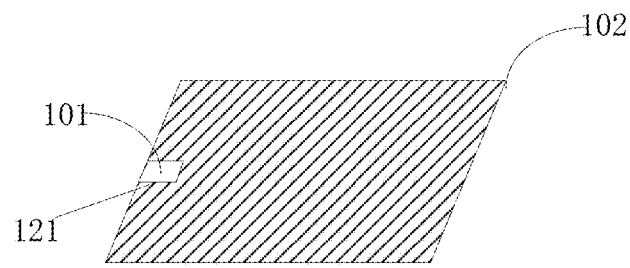

Specifically, the position of the window 121 is the middle position of the first edge on the circuit board of the second sensor 102, as shown in FIG. 5.

A size of the window 121, such as a length and a width, may be determined based on an actual size of the first sensor 101. Thus, the first sensor 101 may collect the distance sensing parameter in the space above the touch control sensing area of the second sensor 102 through the window 121.

Figure 6:
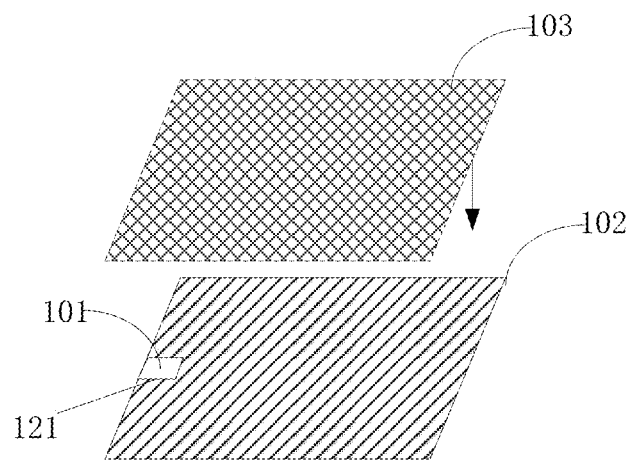

In addition, to protect the first sensor 101 and the second sensor 102, in the embodiment, a protection structure 103 is laid on the surface of the second sensor 102. As shown in FIG. 6, the protection structure 103 covers the first sensor 101. The material of the protection structure 103 allows a signal wave used by the first sensor 101 to collect the distance sensing parameter from penetrating. Thus, the first sensor 101 can collect the distance sensing parameter of any object appearing in the space above the touch control sensing area of the second sensor 102 through the protection structure 103.

Specifically, the protection structure 103 may be made of glass material or mylar material, etc., which allows the signal wave to be transmitted and received. Further, an ink layer can be laid on the protection structure 103. The ink layer will not affect the transmission and reception of the signal wave. Moreover, the color of the ink layer can be consistent with the color of the surface where the second sensor 102 is located on the electronic apparatus, which does not affect the aesthetics of the electronic apparatus.

Figure 7:
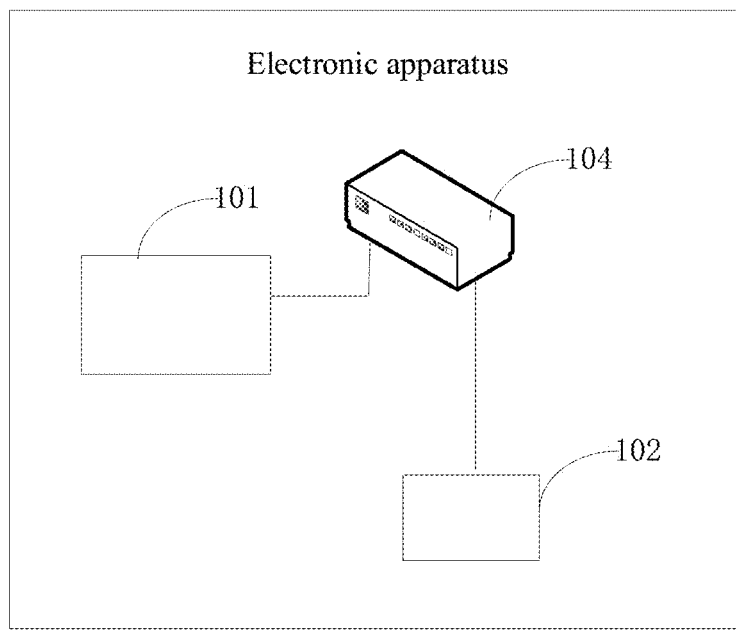

In an embodiment, the electronic apparatus in the embodiment includes the following structure, as shown in FIG. 7:

a processor 104, such as a central processing unit (CPU), etc., after the first sensor 101 collects the distance sensing parameter and the second sensor 102 collects the touch control sensing parameter, the processor 104 being configured to, based on the distance sensing parameter and the touch sensing parameter, generate an operation instruction and respond to the operation instruction to perform a corresponding function.

In other words, after the user performs input operations through the first sensor 101 and the second sensor 102, the processor 104 may generate the corresponding operation instruction based on the distance sensing parameter and touch control sensing parameter and respond to the operation instruction. Then, the processor 104 may provide the user with the corresponding function, such as a function of selecting a movie to play or turning off Specifically, in the embodiment, the processor 104 generating the operation instruction based on the distance sensor and the touch control sensing parameter can be specifically implemented in the following manner.

First, based on the distance sensing parameter, a gesture type of the operating body may be recognized. For example, the processor 104 may analyze the distance sensing parameter through a recognition algorithm to recognize the attitude of the operating body to determine the gesture type of the operating body, such as a single finger sliding gesture, a palm shaking gesture, or a gesture of pressing the finger, etc.

If the gesture type of the operating body is the first type, the processor 104 may generate the operation instruction corresponding to the first type. The first type may be a preset functional gesture type, such as a single finger sliding gesture, a palm shaking gesture, etc. If the gesture type of the operating body is the first type, it indicates that the operating body is performing gesture input through the distance sensor. Then, the processor 104 may generate the operation instruction corresponding to the first type, such as an operation instruction of page turning or turning off, to realize a function of turning pages of a book or turning off.

If the gesture type of the operating body is the second type, the processor may process the touch control sensing parameter by the distance sensing parameter and generate the operation instruction based on the processed touch control sensing parameter. The second type may include other gesture types other than the functional gesture types, such as a gesture of a distance value of the operating body being lower than a certain threshold, or a gesture of the finger pressing down and the distance of the finger being lower than the certain threshold, or a gesture of the palm pressing down. If the gesture type of the operating body is the second type, it indicates that the operating body may perform the touch control input operation through the touch sensor. At this time, the processor 104 may process the touch control sensing parameter by the distance sensing parameter to generate the operation instruction based on the processed touch control parameter, thereby realizing the responded touch control function for the user.

Specifically, in the embodiment, the processor 104 processing the touch sensing parameter with the distance sensing parameter may refer to processing the parameter in the touch control parameter corresponding to the position of the window where the first sensor is located. That is, in the touch control sensing parameter, a situation of missing or sudden changes in the touch control sensing parameter at the position of the window caused by arranging the first sensor on the window may exist. At this time, the processor 104 of the embodiment may correct the parameter of the position of missing or sudden changes in the touch control sensing area in the touch control sensing parameter with the distance sensing parameter. For example, the parameter corresponding to the position of the window in the touch sensing parameter can be set as the target parameter. The target parameter may include a preset parameter value or be associated with the parameter corresponding to the position adjacent to the window in the touch control sensing parameter. For example, the parameter of the position where the first sensor is located in the touch control sensing parameter may be set to be consistent with the parameter of the position around the first sensor. Thus, the processed touch control sensing parameter may be obtained, and the accuracy of the touch control sensing parameter may be improved to realize a higher accuracy rate of the touch input.

It should be noted that, in the embodiment, when the processor 104 processes the touch control sensing parameter with the distance sensing parameter, the processor 104 may first perform anti-fault touch processing on the touch control input based on the distance sensing parameter. For example, based on the distance of the operating body and the area of the operating body in the distance sensing parameter, the processor 104 may determine whether the input of the operating body is the touch control input. Only when the input of the operating body is the touch control input, the touch control sensing parameter may be corrected based on the solution above. Based on the corrected touch control sensing parameter, the corresponding operation instruction may be generated to realize the corresponding function. If the input of the operating body is not the touch control input, the processor 104 may not need to respond to the touch control sensing parameter. No operation instruction may be generated, or the operation instruction is empty. The processor 104 does not respond to the operation of the operating body.

For example, if the distance of the operating body in the distance sensing parameter is less than a certain threshold and the area is greater than a corresponding threshold, the operating body may be located in the touch control sensing area, and the area may exceed a certain value. For example, a palm gesture may be recognized based on the distance sensing parameter. The palm distance may be less than the certain threshold, and the area may be greater than the corresponding threshold. Thus, the touch control may be considered to be a non-input touch control. At this time, the touch control sensing parameter may be set to 0 or empty. That is, no touch control input is received (the operation instruction that is subsequently generated may be a null instruction). Thus, the processed touch control sensing parameter may be obtained, and the anti-fault touch processing may be realized, so as to achieve a higher accuracy rate of the touch input.

Figure 8:
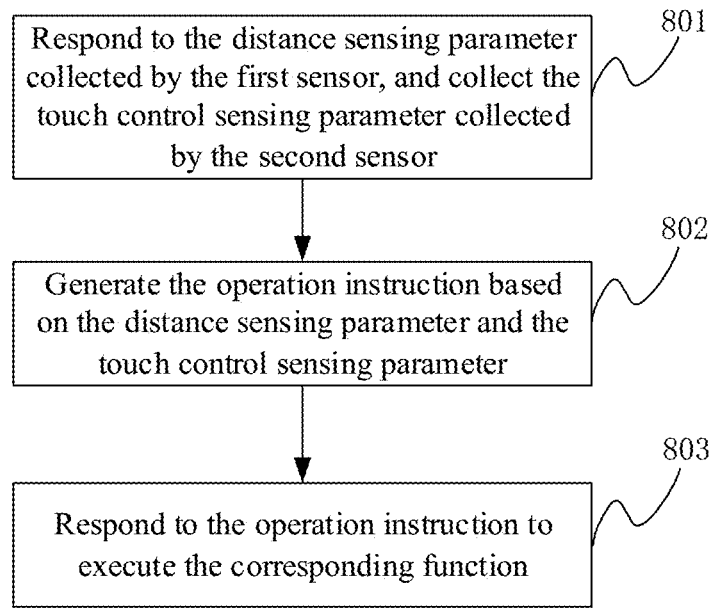
FIG. 8 illustrates a schematic flowchart of implementing a data processing method according to embodiment two of the present disclosure.

FIG. 8 illustrates a schematic flowchart of implementing a data processing method according to embodiment two of the present disclosure. The method may be suitable for an electronic apparatus, including a distance sensor and a touch control sensor, such as a laptop or a computer, which are mainly used to implement a plurality of inputs of the electronic apparatus.

Specifically, the method of the embodiment includes the following steps.

At 801, the distance sensing parameter collected by the first sensor is responded to, and the touch control sensing parameter is collected by the second sensor.

The first sensor may be a distance sensor, which can collect a distance sensing parameter for an object in a specific space. The distance sensing parameter may be used to detect a status parameter, such as a distance, a position, and an attitude of the object. The second sensor may be a touch control sensor, which can collect a touch control sensing parameter on a touch control sensing area. The touch control sensing parameter may be used to detect a parameter such as a position and a trajectory of the touch control operation.

In the embodiment, the touch control sensing area of the second sensor may cover a specific area on a first surface of the electronic device, such as C surface of the laptop. The specific area may be an area that facilitates the user to perform the touch control operation. The first sensor may be arranged at a position on the electronic apparatus corresponding to the second sensor. Thus, the first sensor may collect the distance sensing parameter in the space above the touch control sensing area.

At 802, the operation instruction is generated based on the distance sensing parameter and the touch control sensing parameter.

At 803, the operation instruction is responded to to execute the corresponding function.

That is to say, after the user performs the input operation through the first sensor and the second sensor, in the embodiment, the electronic apparatus may generate the corresponding operation instruction based on the distance sensing parameter and the touch control sensing parameter. After responding to the operation instruction, the electronic apparatus may provide the corresponding function for the user, e.g., a function of selecting a move to play or turning off.

It can be seen from the above technical solutions that, in the data processing method of the embodiment two of the present disclosure, by arranging the first sensor capable of collecting the distance sensing parameter on the electronic apparatus, the first sensor may collect the distance sensing parameter in the space above the touch control sensing area of the second sensor. Then, the electronic apparatus may generate the operation instruction based on the distance sensing parameter and touch control sensing parameter and realize the corresponding function. It can be seen that, in the embodiment, by arranging the distance sensor to measure the distance sensing parameter in the space above the touch control sensing area, in addition to the touch control input, the electronic apparatus can also realize the input through the distance sensor. Thus, the input manner of electronic apparatus may be enriched, which may improve the user experience.

In an embodiment, the first sensor is arranged at the position of the window of the circuit board of the second sensor. Referring to the structure in FIG. 4, correspondingly, in step 802 of the embodiment, generating the operation instruction based on the distance sensing parameter and the touch control sensing parameter is specifically implemented through the following manner.

First, based on the distance sensing parameter, a gesture type of the operating body may be recognized. For example, the electronic apparatus may analyze the distance sensing parameter through a recognition algorithm to recognize the attitude of the operating body to determine the gesture type of the operating body, such as a single finger sliding gesture, a palm shaking gesture, or a gesture of pressing the finger, etc.

If the gesture type of the operating body is the first type, the electronic apparatus may generate the operation instruction corresponding to the first type. The first type may be a preset functional gesture type, such as a single finger sliding gesture, a palm shaking gesture, etc. If the gesture type of the operating body is the first type, it indicates that the operating body is performing gesture input through the distance sensor. Then, the electronic apparatus may generate the operation instruction corresponding to the first type, such as an operation instruction of page-turning or turning off, to realize a function of turning pages of a book or turning off.

If the gesture type of the operating body is the second type, the electronic apparatus may process the touch control sensing parameter by the distance sensing parameter and generate the operation instruction based on the processed touch control sensing parameter. The second type may include other gesture types other than the functional gesture types, such as a gesture of a distance value of the operating body being lower than a certain threshold, or a gesture of the finger pressing down and the distance of the finger being lower than the certain threshold, or a gesture of the palm pressing down. If the gesture type of the operating body is the second type, it indicates that the operating body may perform the touch control input operation through the touch sensor. At this time, the electronic apparatus may process the touch control sensing parameter by the distance sensing parameter to generate the operation instruction based on the processed touch control parameter, thereby realizing the responded touch control function for the user.

Specifically, in the embodiment, the electronic apparatus processing the touch sensing parameter with the distance sensing parameter may refer to processing the parameter in the touch control parameter corresponding to the position of the window where the first sensor is located. That is, in the touch control sensing parameter, a situation of missing or sudden changes in the touch control sensing parameter at the position of the window caused by arranging the first sensor on the window may exist. At this time, the electronic apparatus of the embodiment may correct the parameter of the position of missing or sudden changes in the touch control sensing area in the touch control sensing parameter with the distance sensing parameter. For example, the parameter corresponding to the position of the window in the touch sensing parameter can be set as the target parameter. The target parameter may include a preset parameter value or be associated with the parameter corresponding to the position adjacent to the window in the touch control sensing parameter. For example, the parameter of the position where the first sensor is located in the touch control sensing parameter may be set to be consistent with the parameter of the position around the first sensor. Thus, the processed touch control sensing parameter may be obtained, and the accuracy of the touch control sensing parameter may be improved to realize a higher accuracy rate of the touch input.

It should be noted that, in the embodiment, when the electronic apparatus processes the touch control sensing parameter with the distance sensing parameter, the electronic apparatus may first perform anti-fault touch processing on the touch control input based on the distance sensing parameter. For example, based on the distance of the operating body and the area of the operating body in the distance sensing parameter, the electronic apparatus may determine whether the input of the operating body is the touch control input. Only when the input of the operating body is the touch control input, the touch control sensing parameter may be corrected based on the solution above. Based on the corrected touch control sensing parameter, the corresponding operation instruction may be generated to realize the corresponding function. If the input of the operating body is not the touch control input, the electronic apparatus may not need to respond to the touch control sensing parameter. No operation instruction may be generated, or the operation instruction is empty. The electronic apparatus may not respond to the operation of the operating body.

For example, if the distance of the operating body in the distance sensing parameter is less than a certain threshold and the area is greater than a corresponding threshold, the operating body may be located in the touch control sensing area, and the area may exceed a certain value. For example, a palm gesture may be recognized based on the distance sensing parameter. The palm distance may be less than the certain threshold, and the area may be greater than the corresponding threshold. Thus, the touch control may be considered to be a non-input touch control. At this time, the touch control sensing parameter may be set to 0 or empty. That is, no touch control input is received (the operation instruction that is subsequently generated may be a null instruction). Thus, the processed touch control sensing parameter may be obtained, and the anti-fault touch processing may be realized to achieve a higher accuracy rate of the touch input.

The following takes a laptop with a touch area as an example to illustrate the technical solution in the embodiment.

Figure 9:
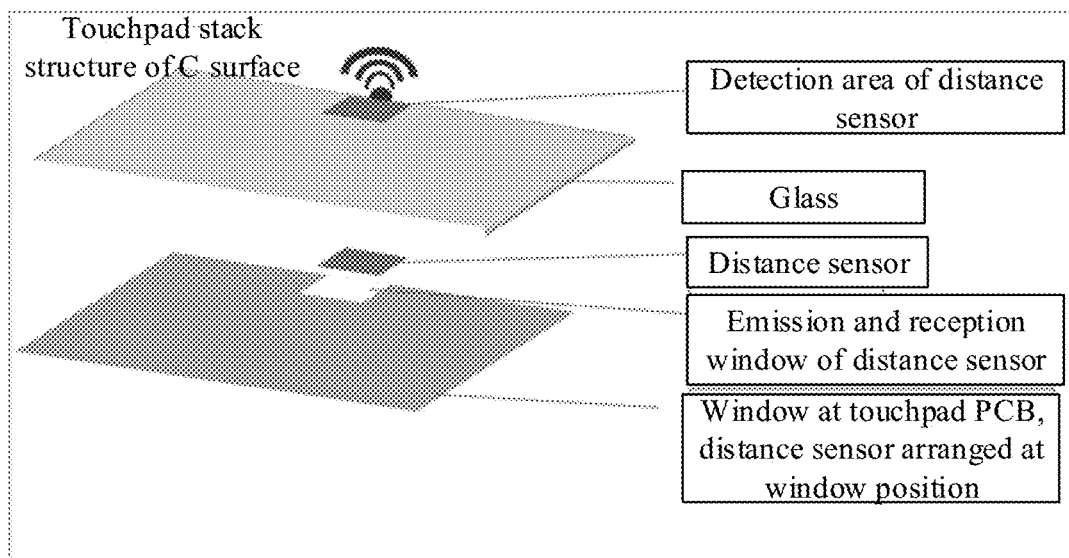
FIG. 9 to FIG. 11 illustrate schematic diagrams of other structures in practical applications according to the embodiment of the present disclosure.

As shown in FIG. 9, to implement the touch input and a non-contact gesture input at the same time on a laptop with a keyboard on the C surface, in the embodiment, a window is arranged on a printed circuit board (PCB) of the touchpad on the C surface. The distance Sensor may be integrated into the window area.

The distance sensor may transmit and receive a signal directly through the glass or mylar material in the window area of the touchpad. To ensure consistency, as shown in FIG. 9, in the embodiment, the window area can be painted with the same color ink as the C surface. Therefore, the touchpad is in a stacked structure. The ink material may include a material that allows a signal wave in the same frequency band as the emitted light to penetrate.

Based on the solution above, after the window of touchpad is opened, the touchpad will have a detection dead zone problem. To solve this problem, the following method of processing the touch control sensing parameter may be used in the embodiment to remove the dead zone problem due to the PCB window of the touchpad, which specifically includes as follows.

Figure 10:
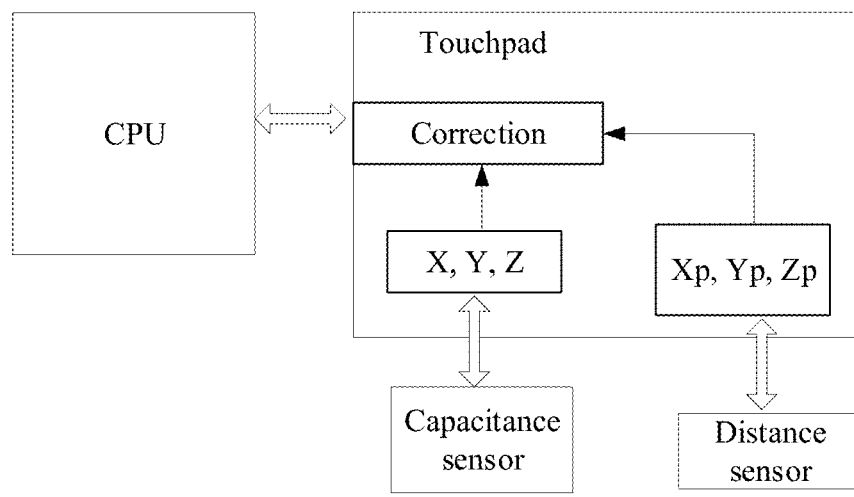
Figure 11:
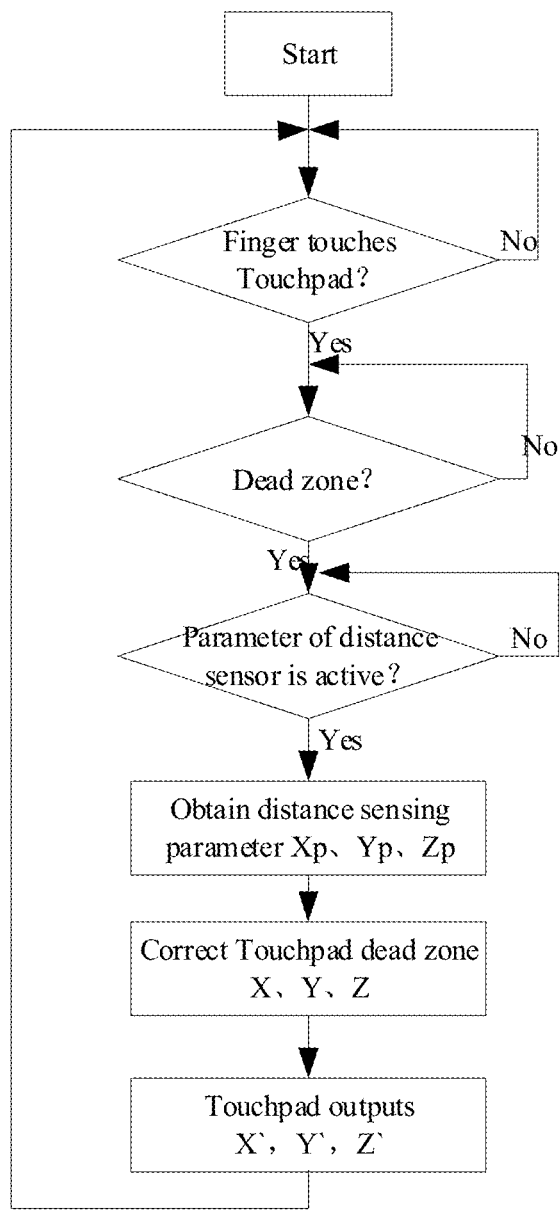

In connection with a data flow diagram in a laptop hardware architecture in FIG. 10, the signal of the distance sensor may be used as a touchpad correction signal in the embodiment. When the user finger touches the distance sensor, and the user is determined to perform the non-gesture input, the distance sensor transmits the signal to the touchpad. The touchpad may use X, Y, and Z data in the sensing parameter of the distance sensor to compensate the data missing in the touch control sensing parameter collected by a capacitance sensor in the touchpad. Thus, the entire touchpad detection area signal is completed. After the signal is transmitted to the CPU, the CPU responds without the dead zone. The specific process is shown in FIG. 11 as follows.

After start, the electronic apparatus first determines whether a finger touches the touchpad, if yes, then continues to detect whether a dead zone exists. When the dead zone is detected, the electronic apparatus determines whether the parameter of the distance sensor is in an active status, if yes, then obtains the Xp, Yp, and Zp data in the distance sensing parameter. Then, the electronic apparatus corrects the data in the dead zone X, Y, and Z in the touchpad data to obtain the output parameter of the touchpad: X', Y', and Z'.

It can be seen that the embodiment provides a new manner of integrating the distance sensor and keeping the parameter integrity of the smart touch pard.

Specifically, with the laptop of the embodiment, the user can not only apply the original touchpad function, but also realize functions such as non-contact operation and intelligent monitoring, and improve the user experience. Secondly, the detection position of the distance sensor may be more suitable for the user scenario, which can improve recognition efficiency and the user experience. Further, in the embodiment, the touch control sensing parameter may be corrected to solve the dead zone problem of the touchpad after arranging the window.

Figure 12:
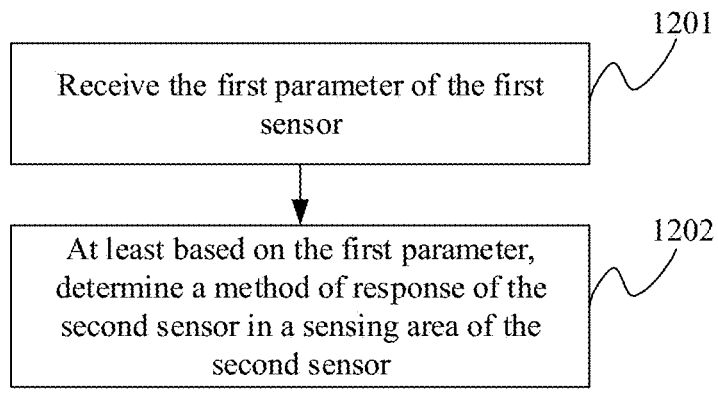
FIG. 12 illustrates a schematic flowchart of a data processing method according to embodiment one of the present disclosure.

FIG. 12 illustrates a schematic flowchart of a data processing method according to embodiment one of the present disclosure. The method is suitable for an electronic apparatus, such as a laptop or a computer. The electronic apparatus includes a first sensor and a second sensor. The first sensor and the second sensor are different types.

Specifically, the method of the embodiment includes the following steps.

At 1201, the first parameter of the first sensor is received.

The first sensor may be a distance sensor. Correspondingly, a first parameter of the first sensor may be a distance sensing parameter. The distance sensor may emit a signal wave and receive a returned signal reflected after the signal wave encounters an object to generate the distance sensing parameter, which may realize a gesture input. The distance sensing parameter may be used to recognize information such as a shape, a position, and an attitude of the object. For example, a gesture type of an operating body may be recognized.

At 1202, at least based on the first parameter, a method of response of the second sensor may be determined in a sensing area of the second sensor.

The second sensor may respond to the input operation with the determined method of response in the sensing area.

It should be noted that, in the embodiment, the electronic apparatus may recognize the first parameter of the first sensor. Then, the electronic apparatus may determine the method of response of the second sensor in the sensing area based on the recognition result. Different first parameters may correspond to different method of responses in the second sensor.

Figure 13:
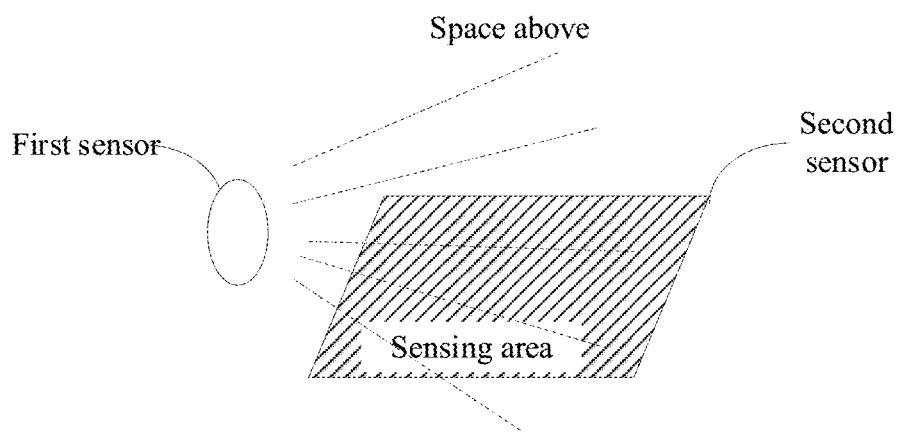
FIG. 13 to FIG. 19 illustrates diagrams of application examples according to the embodiment of the present disclosure.

Specifically, the first sensor may collect the first parameter in a space above the sensing area of the second sensor. It can be seen that, in the embodiment, the electronic apparatus may determine the method of response of the second sensor in the sensing area based on the first parameter collected by the first sensor in the space above the sensing area of the second sensor. As shown in FIG. 13, when the first parameter in the space above the sensing area is different, the method of response in the sensing area is different.

Figure 14:
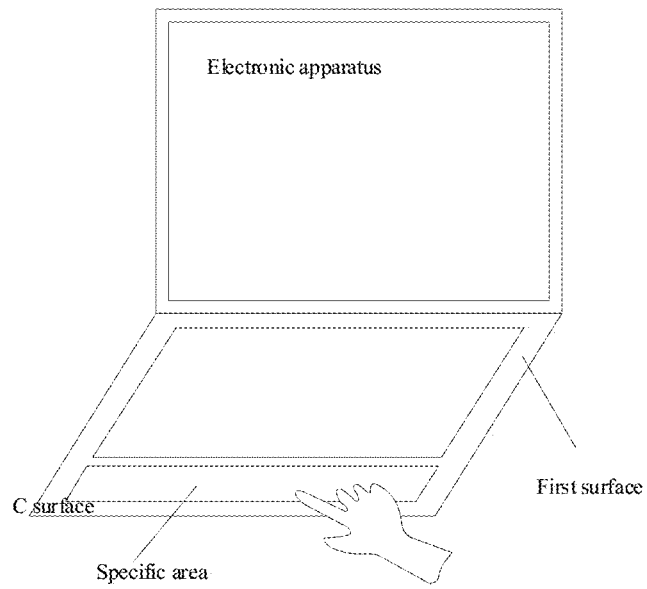

It should be noted that the sensing area of the second sensor covers a specific area of the first surface of the electronic apparatus, such as all or part of the area below the keyboard on a C surface of the laptop. As shown in FIG. 14, the first sensor collects the first parameter in the space above the sensing area.

It can be seen from the above technical solutions that, in a data processing method provided by embodiment one of the present disclosure, after receiving the first parameter of the first sensor, the electronic apparatus may determine the method of response of the second sensor in the sensing area of the second sensor based on the first parameter. Thus, the second sensor may respond to the input operation in the sensing area in the determined method of response. It can be seen that, in the embodiment, based on the change or difference of the first parameter, the second sensor may respond to the input operation in the sensing area of the second sensor in a corresponding method of response. Therefore, the electronic apparatus may provide a variety of method of responses for the user input operation, which improves user experience significantly.

In an embodiment, at step 1202, at least based on the first parameter, determining the method of response of the second sensor in the sensing area of the second sensor specifically includes the following manner.

Based on the first parameter, the electronic apparatus may determine a response zone in the sensing area to cause the second sensor to respond to the input operation with the response zone.

Figure 15:
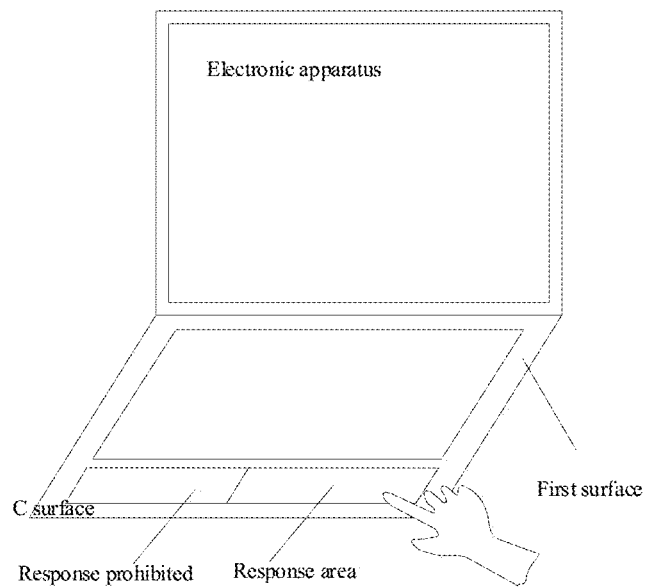

Other areas of the sensing area except the response zone are configured to be prohibited from responding to the input operation. That is, in the embodiment, based on the first parameter collected by the first sensor in the space above the sensing area of the second sensor, the electronic apparatus may determine the response zone that responds to the input operation in the sensing area of the second sensor. The other areas in the sensing area of the second sensor may be prohibited from responding to the input operation except for the response zone, as shown in FIG. 15.

Specifically, in the embodiment, determining the response zone in the sensing area based on the first parameter may be specifically implemented as follows.

First, the electronic apparatus may recognize a position parameter of the operating body in the first parameter, such as a location and a distance of the operating body relative to the first sensor. In addition, the position parameter may further include a shape parameter of the operating body relative to the first sensor or the sensing area of the second sensor, such as a size or an attitude.

Figure 16:
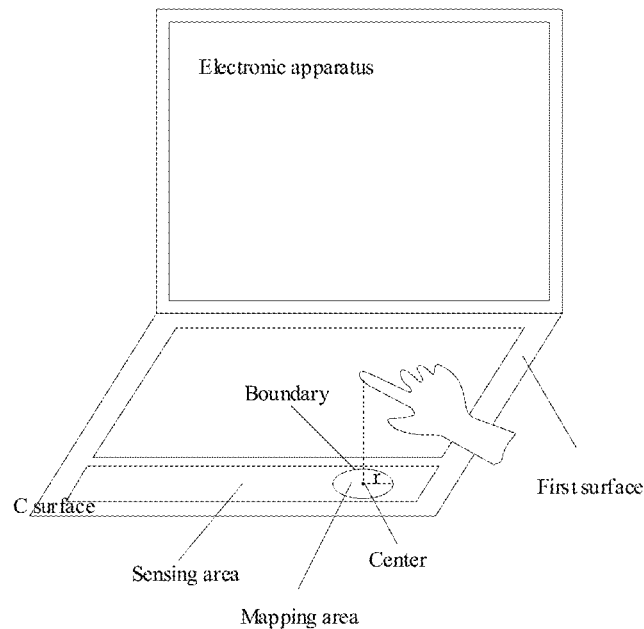

Then, based on the position parameter, the electronic apparatus may determine a mapping area of the operating body mapped to the sensing area. The first sensor and the second sensor may have a relative positional relationship. For example, the first sensor and the second sensor may be in a relative position relationship that the first sensor can collect the first parameter in the space above the sensing area of the second sensor. Therefore, in the embodiment, based on the position parameter of the operating body, the mapping area of the operating body may be mapped in the sensing area of the second sensor. The mapping area may include an area center and an area boundary. Specifically, the area center may correspond to the position where the operating body is mapped in the sensing area. The area boundary may correspond to the shape of the operating body relative to the first sensor or the operating body relative to the sensing area. For example, the area boundary may include a circular boundary centered on the position where the operating body is mapped in the sensing area and with a size radius of the operating body relative to the shape of the sensing area or a preset radius length as a radius, as shown in FIG. 16.

Lastly, based on the mapping area, the electronic apparatus may determine the response zone in the sensing area.

Figure 17:
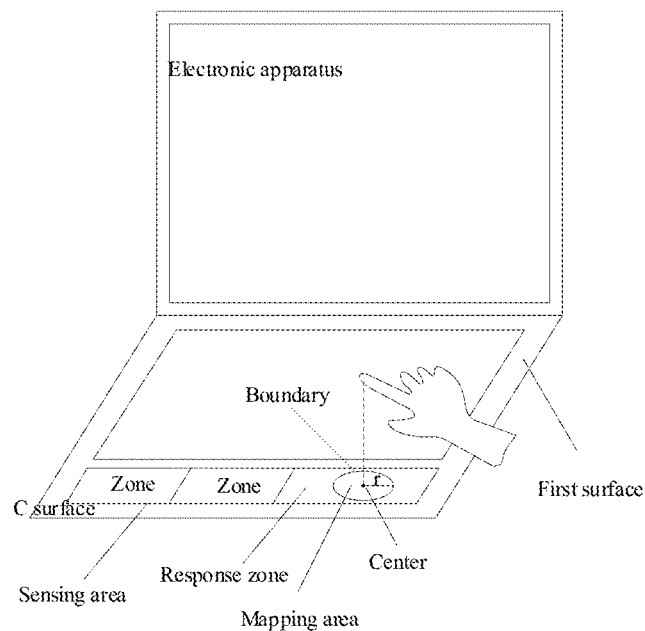

In an embodiment, in a plurality of zones of the sensing area, the electronic apparatus determines a zone corresponding to a distribution position of the mapping area in the sensing area as the response zone. As shown in FIG. 17, the sensing area includes the plurality of zones that are pre-divided. Each zone corresponds to a different function. Left, middle, and right zones are divided for the sensing area. After determining the mapping area of the operating body in the sensing area, the electronic apparatus may determine the distribution position of the mapping area in the sensing area. Then, the electronic apparatus may determine the zone where the distribution position is located as the response zone. As shown in FIG. 17, the right zone is the response zone.

Further, in the embodiment, after determining the mapping area, or determining the response zone based on the mapping area, the electronic apparatus may perform anti-fault touch recognition on the operating body. For example, the electronic apparatus may determine whether the area of the mapping area is greater than or equal to a preset threshold and a distance between the operating body and the sensing area is less than a certain threshold. If yes, the electronic apparatus may consider that the operating body does not perform the gesture input or the touch control input.

Thus, the electronic apparatus may not respond to the input operation of the operating body to prevent the fault touch. If the distance between the operating body and the sensing area is greater than the certain threshold, it indicates that the operating body may perform the gesture input. Thus, the electronic apparatus may perform gesture recognition on the operating body to realize the function of the gesture input.

In another embodiment, the electronic apparatus may determine a response zone in the sensing area based on whether the mapping area is a valid input area. For example, in the embodiment, the electronic apparatus may determine whether the area of the mapping area is greater than or equal to the preset threshold to determine the response zone.

Specifically, if the area of the mapping area is greater than or equal to the preset threshold, it indicates that the mapping area of the operating body in the sensing area is too large, and the electronic apparatus may consider that the operating body does not perform the touch control input. Thus, if the distance between the operating body and the sensing areas is less than the certain threshold, the electronic apparatus may determine the other areas in the sensing area except for the mapping area as the response zone. The mapping area may be configured as a zone that is prohibited from responding to the input operation. That is, if the area of the mapping area is greater than or equal to the preset threshold, the electronic apparatus may determine the mapping area as the fault touch area of the operating body. Thus, to avoid touch errors, the electronic apparatus may determine the other areas in the sensing area except for the mapping area as the response zone. On the contrary, in the mapping area, the electronic apparatus will not respond to input operation to prevent the fault touch.

However, if the area of the mapping area is less than the preset threshold, the electronic apparatus may determine the distribution position of the operating body in the sensing area based on the mapping area. The electronic apparatus may determine the response zone in the sensing area. For example, the sensing area may include a plurality of pre-divided zones. In the embodiment, the electronic apparatus may determine an area in the sensing area closest to the distribution position of the mapping area as the response zone. The other areas may be configured to be prohibited from responding to the input operation.

Further, in the embodiment, after determining the response zone, the electronic apparatus may output a response mark at a position in a display area corresponding to the response zone. The display area may be a display area on a same display screen. The display area may be divided. Thus, when the right zone is the response zone, a cursor may be output in the right display area of the display area. Alternatively, the display area may include display areas on different display screens, e.g., a display area of a local monitor or a display area of an external monitor. Thus, if the display area of the local monitor is the response zone, the cursor may be output in the display area of the local monitor.

In an embodiment, step 1202, at least based on the first parameter, determining the method of response of the second sensor in the sensing area of the second sensor may be implemented by the following manner.

Based on the first parameter, the response mark may be output in the display area corresponding to the sensing area. The second sensor may respond to the input operation with the response mark.

Figure 18:
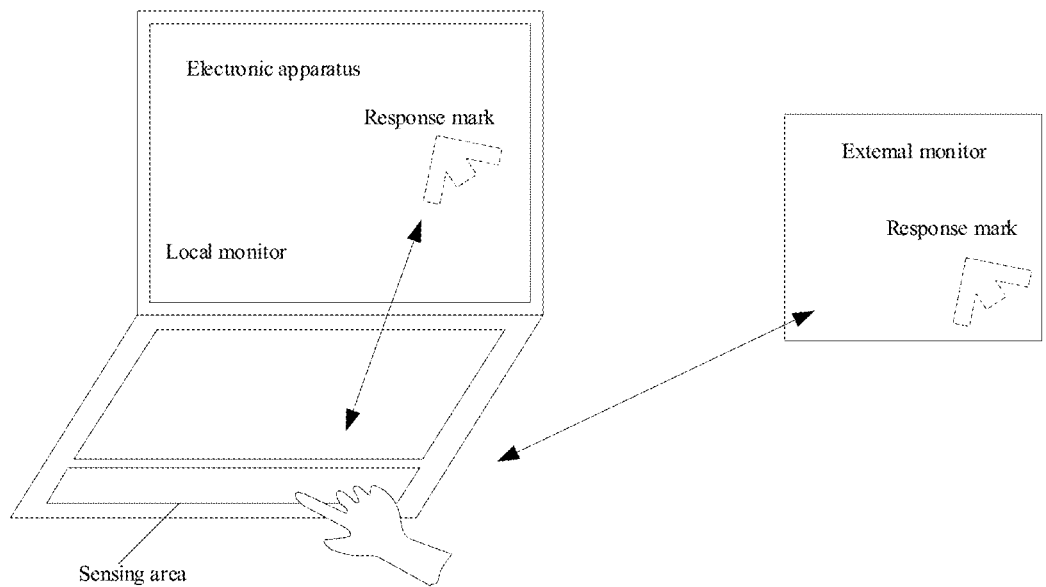

The display area may refer to the display area on the electronic apparatus where the second sensor is located and configured to output the display content. The display area may include the display area on the same display screen. The display area may be divided. The first parameter may be different. The display area where the corresponding response mark is output is different, such as the left area or the right area of the same display screen. Alternatively, the display area can include the display areas on different display screens, such as the display area of the local monitor and the display area of the external monitor. The first parameter may be different, and the display area where the corresponding response mark is output may be different. For example, the response mark may be displayed in the display area of the local monitor or in the display area of the external monitor, as shown in FIG. 18.

It should be noted that the response mark may include a cursor or another mark. In the embodiment, the response mark may be output in the display area corresponding to the sensing area to prompt the user to perform the input operation on the display area.

Specifically, in the embodiment, outputting the response mark in the display area corresponding to the sensing area based on the first parameter can be specifically implemented as follows.

First, the electronic apparatus may recognize the position parameter of the operating body in the first parameter, such as the location and the distance of the operating body relative to the first sensor. In addition, the position parameter may further include the shape parameter of the operating body relative to the first sensor or the sensing area of the second sensor, such as a size or an attitude.

Then, based on the position parameter, the electronic apparatus may determine a mapping area of the operating body that is mapped to the sensing area. The first sensor and the second sensor may have a relative positional relationship. For example, the first sensor and the second sensor may be in the relative position relationship that the first sensor can collect the first parameter in the space above the sensing area of the second sensor. Therefore, in the embodiment, based on the position parameter of the operating body, the mapping area of the operating body may be mapped in the sensing area of the second sensor. The mapping area may include the area center and the area boundary. Specifically, the area center may correspond to the position where the operating body is mapped in the sensing area. The area boundary may correspond to the shape of the operating body relative to the first sensor or the operating body relative to the sensing area. For example, the area boundary may include a circular boundary centered on the position where the operating body may be mapped in the sensing area and with a size radius of the operating body relative to the shape of the sensing area or the preset radius length as the radius.

Figure 19:
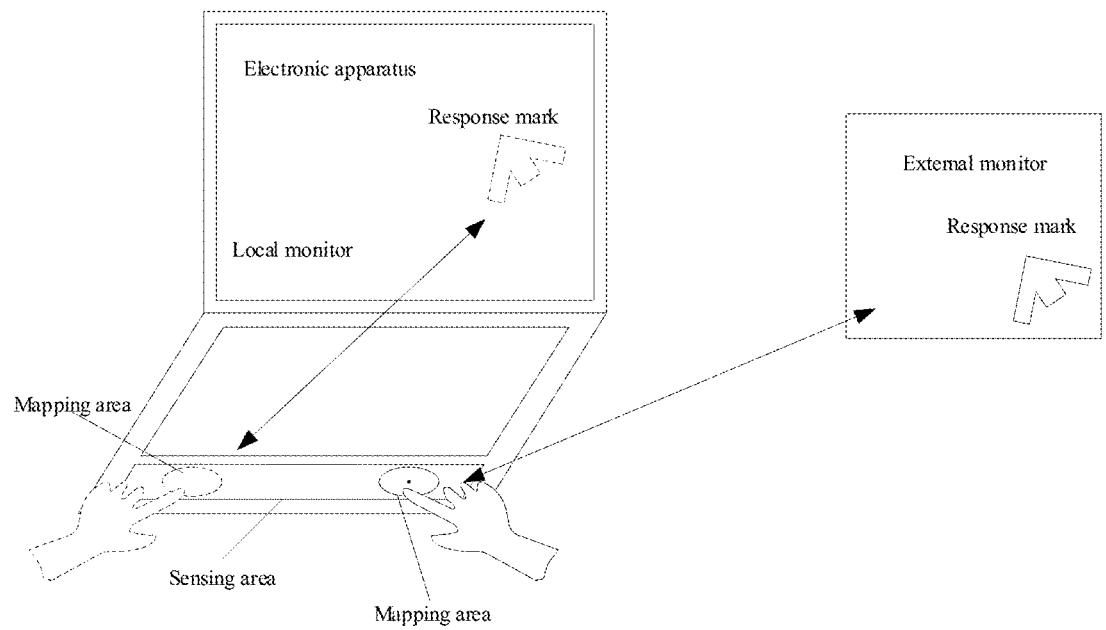

Lastly, based on the mapping area, the electronic apparatus may output the response mark in the corresponding display area. For example, the electronic apparatus may determine the display area associated with the mapping area and output the response mark on the display area corresponding to the mapping area. Thus, the display area may be associated with the relative position of the mapping area on the sensing area. That is, in the embodiment, based on the position of the mapping area on the sensing area, the electronic apparatus may determine a corresponding display area to output the response mark. If the mapping area is on the left side of the sensing area, the display area may be the display area of the local monitor. If the mapping area is on the right side of the sensing area, the display area may be the display area of the external monitor. As shown in FIG. 19, the response mark corresponds to the mapping area. That is, the response mark corresponds to the operating body.

Based on this, after determining the display area where the response mark is output, other display areas, such as an external display area, may be configured to be prohibited from responding to the input operation or perform no processing.

Figure 20:
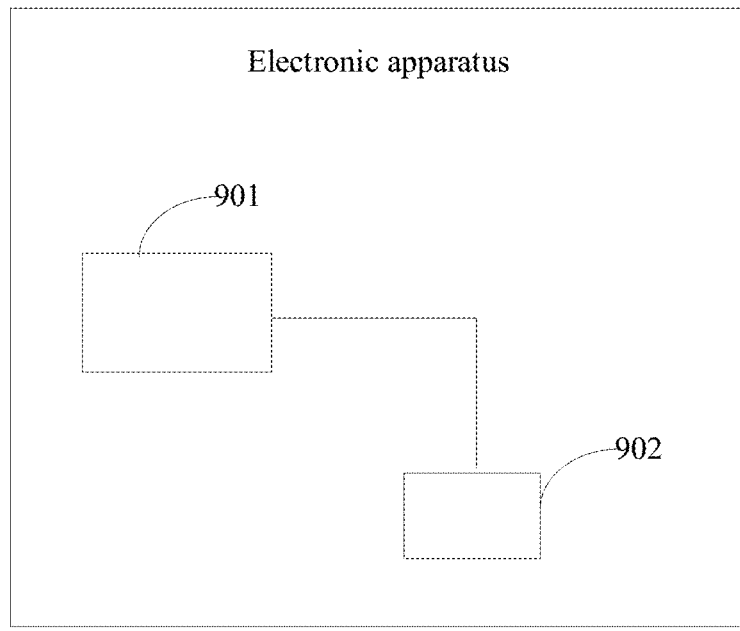
FIG. 20 illustrates a structural diagram of an electronic apparatus according to embodiment two of the present disclosure.

FIG. 20 illustrates a structural diagram of an electronic apparatus according to embodiment two of the present disclosure. The electronic apparatus may include a laptop and includes the following structures.

A first sensor 901 is configured to collect a first parameter. For example, the first sensor 901 may be a distance sensor, and the first parameter may be a distance parameter, which can realize the gesture input.

A second sensor 902 includes a sensing area and is configured to collect the second parameter. For example, the second sensor 902 may be a touch control sensor, and the second parameter may be a touch control sensing parameter, which can implement the touch control input.

The second sensor 902 may be configured to, at least based on the first parameter, determine the method of response of the second sensor in the sensing area of the second sensor. The second sensor may respond to the input operation in the sensing area.

It needs to be noted that, in the embodiment, by recognizing the first parameter of the first sensor, the second sensor 902 may determine the method of response of the second sensor in the sensing area based on the recognition result. Different first parameters may correspond to different method of responses in the second sensor.

Specifically, the first sensor may collect the first parameter in the space above the sensing area of the second sensor. It can be seen that, in the embodiment, the second sensor may determine the method of response of the second sensor in the sensing area based on the first parameter collected by the first sensor in the space above the sensing area of the second sensor. When the first parameter collected in the space above the sensing area is different, the method of response in the sensing area may be different.

It needs to be noted that the sensing area of the second sensor covers the specific area of the first surface of the electronic apparatus, for example, all or a part of the area below the keyboard on the C surface of the laptop. The first sensor may collect the first parameter in the space above the sensing area.

It can be seen from the above technical solution, after receiving the first parameter of the first sensor, the electronic apparatus of embodiment two of the present disclosure may determine the method of response of the second sensor in the sensing area of the second sensor based on the first parameter. Thus, the second sensor may respond to the input operation in the sensing area in the determined method of response. It can be seen that, in the embodiment, based on the changes or difference of the first parameter, the second sensor may respond to the input operation in a corresponding method of response in the sensing area of the second sensor. As such, the electronic apparatus may provide various method of responses for the user input operation, which significantly improves the user experience.

Figure 21:
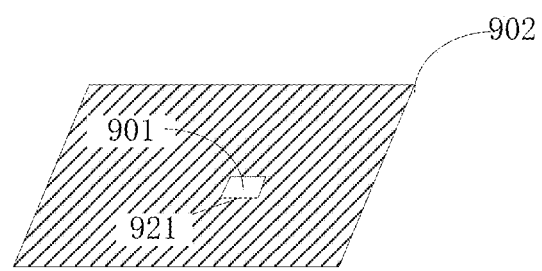
FIG. 21 to FIG. 26 illustrate diagrams of other application examples according to the embodiment of the present disclosure.
Figure 22:
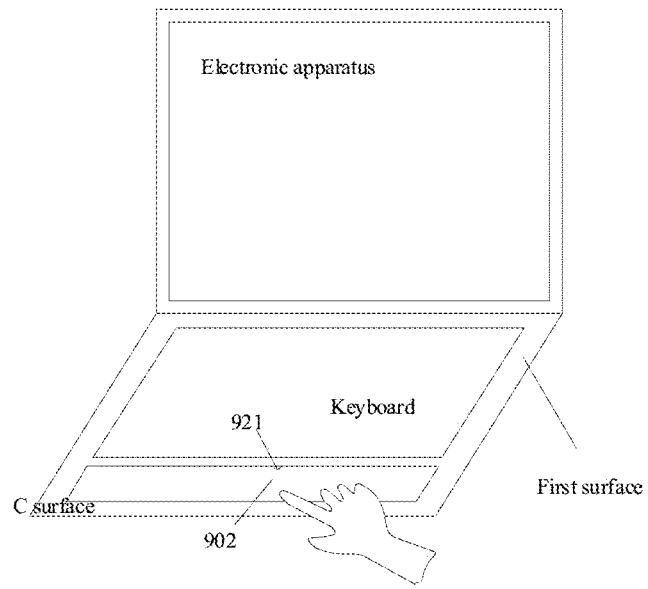

In an embodiment, the first sensor 901 may be arranged at the position of the window 921 of the circuit board of the second sensor 902. As shown in FIG. 21, the first sensor 901 collects the first parameter through the window 921. Specifically, the window 921 may be arranged in a middle position of the first edge on the circuit board of the second sensor 902. As shown in FIG. 22, the area below the C surface of the laptop is the sensing area of the touch control sensor. The window 921 is arranged at the middle position of the sensing area close to the edge of the keyboard on the C surface. Thus, the distance sensor may collect the distance sensing parameter in the space above the sensing area. The touch control sensor may determine the method of response in the sensing area based on the distance sensing parameter collected by the distance sensor in the space above the sensing area. For example, the response mark may be output in the corresponding display area (local display or external display) to prompt the user to input or respond to the input operation with different response zones in the sensing area to provide the user with different input experience.

In addition, the electronic apparatus of the embodiment may include a processor, which may be configured to generate the operation instruction based on the first parameter and the second parameter of the second sensor to execute the corresponding function.

Specifically, the processor may recognize the gesture type of the operating body based on the distance sensing parameter and determine the gesture type. If the gesture type is the first type, the processor may generate the operation instruction corresponding to the first type to realize the gesture input. If the gesture type is the second type, the processor may process the touch control parameter with the distance sensing parameter and generate the operation instruction based on the processed touch control sensing parameter to realize the touch control input.

Specifically, during the touch control input, the processor may perform anti-fault touch recognition based on the distance sensing parameter.

Further, during the touch control input, the processor may process the touch control sensing parameter with the distance sensing parameter. For example, the processor may set the parameter in the touch control sensing parameter corresponding to the position of the window as the target parameter. The target parameter may be associated with the parameter in the touch control sensing parameter corresponding to the position of the window.

It needs to be noted that, for the specific embodiments of the electronic apparatus of the embodiment, reference may be made to the corresponding content in the above description, which is not repeated here.

The following takes a laptop with a touch control area as an example to illustrate the technical solutions in the embodiment.

First, in the embodiment, a distance sensor may be integrated at the touchpad of the laptop. The user can implement the original touchpad function on the touchpad and the non-contact operation through the touchpad, such as the gesture input, which may realize functions of smart screen turning off or a quick operation. The specific manner is as follows.

A window is arranged on the PCB of the touchpad. The distance sensor such as a Radar sensor is integrated into the window area.

The Radar sensor may transmit and receive a signal directly through the glass or mylar material in the window area of the touchpad (the touchpad is large, for example, the entire area below the keyboard is the touchpad and is integrated with the Radar sensor).

Figure 23:
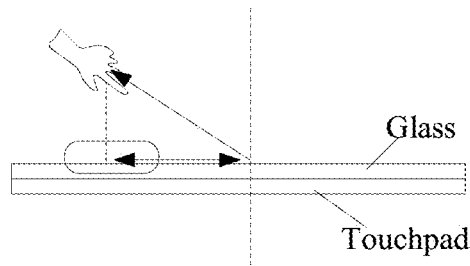

Specifically, in the embodiment, Radar may be configured to detect distance L and orientation a of a user hand. A mapping area of the hand landing or mapped on the touchpad may be obtained through calculation and prediction. As shown in FIG. 23, center position Le of the mapping area may be calculated. The touchpad area corresponding to R(Le, r) may be defined as the area where the palm will land, that is, the mapping area, where r may be a preset value or a value calculated based on a shape parameter of the user hand detected by the Radar.

Figure 24:
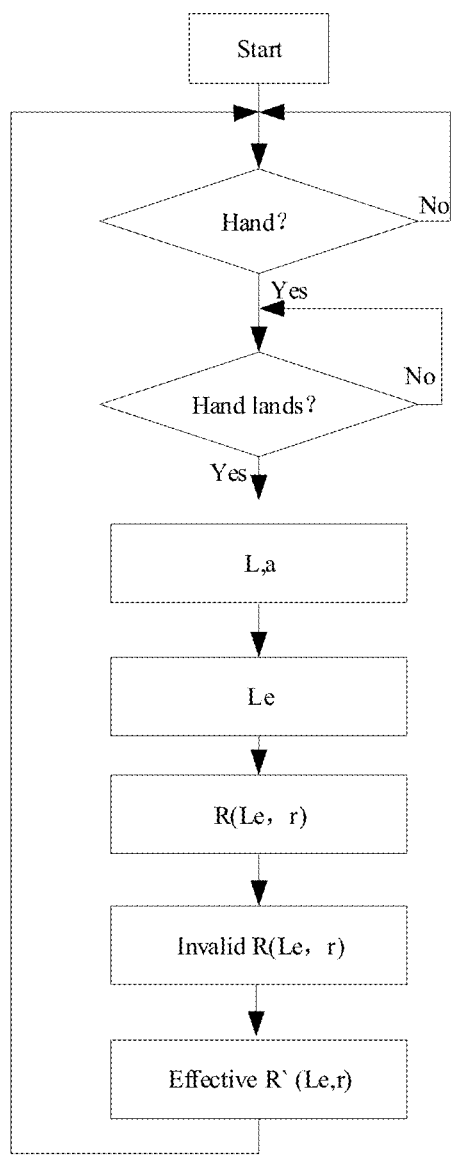

In an embodiment, the microcontroller unit (MCU) of the touchpad sets the calculated R (Le, r) area as an anti-fault touch area in advance. Thus, the set area is an invalid area. The other area R' (Le, r) of the sensing area are effective response areas. Further, in the embodiment, the radar sensor detects the hand movement status in real-time and adjusts the R(Le, r) area and R'(Le, r) area in real-time. Thus, smart dynamic switching may be realized, which improves the user experience, as shown in FIG. 24.

Figure 25:
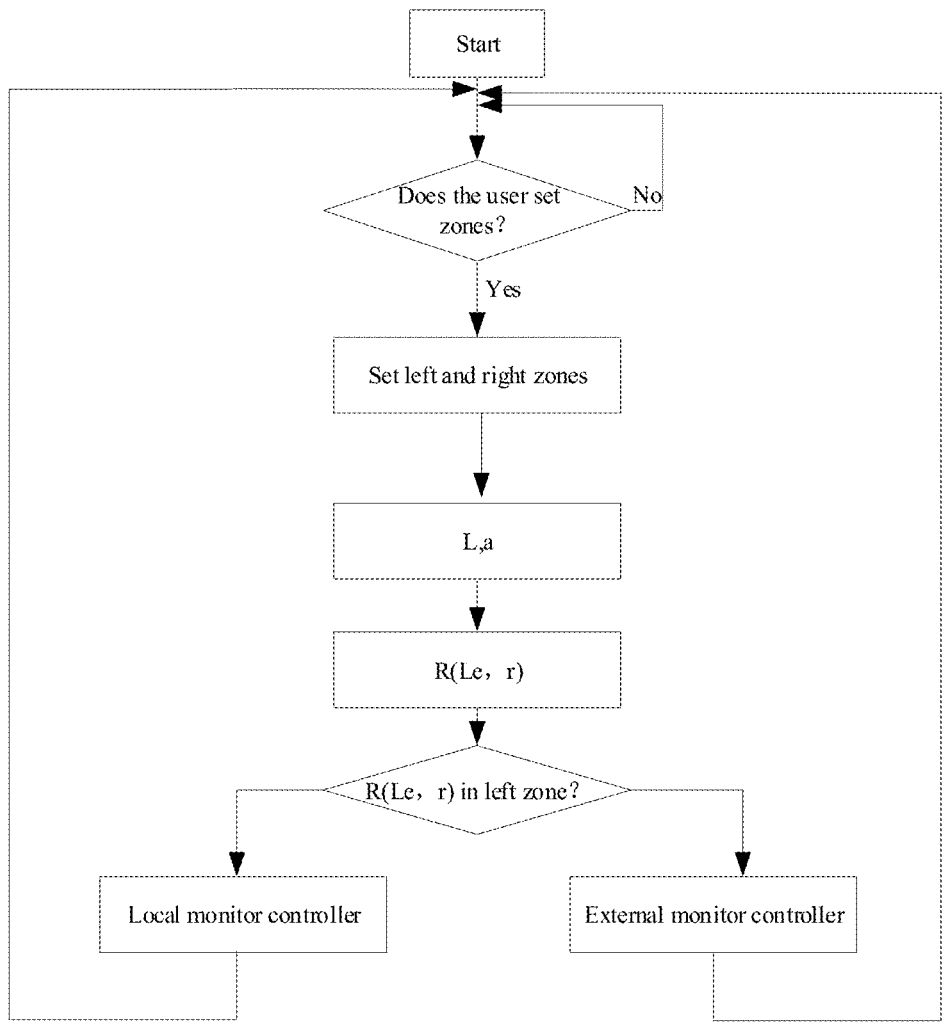

In another embodiment, the touchpad of the electronic apparatus may have a zone mode, which allows the user to pre-define zones of the touchpad, e.g., define the left and right areas or three areas. The user may divide the touchpad into different functional areas. When the Radar detects that the user hand lands into this area, an enabled area of the touchpad may be intelligently switched. Alternatively, when the user connects an external display to the electronic apparatus, set the right half portion of the touchpad as the external display controller, and the left half portion of the touchpad as the local display controller. When the Radar detects that the area R (Le, r) where the user hand lands is the left zone of the touchpad, the cursor is automatically adjusted to the local display controller. Otherwise, the cursor is automatically adjusted to the external display controller. Therefore, in the embodiment, the operation interface and the response area are dynamically switched by detecting the gesture input of the user hand, as shown in FIG. 25.

Figure 26:
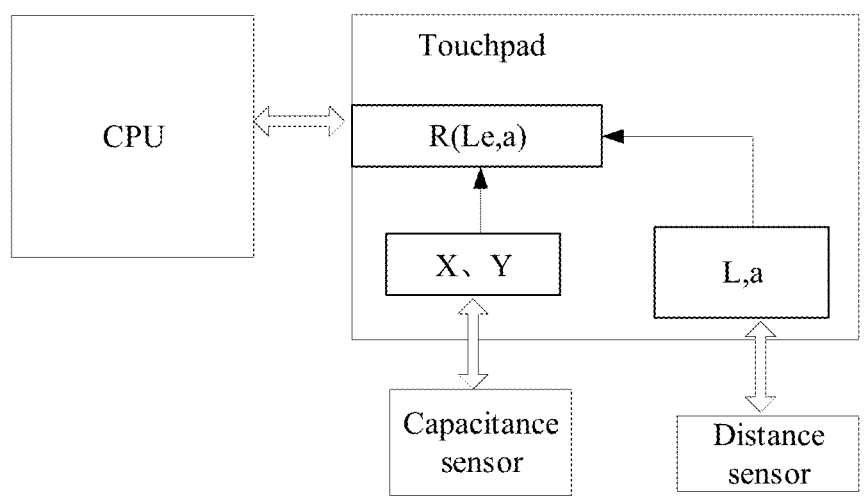

In a specific embodiment, as shown in a data flow direction of a hardware architecture in FIG. 26, in the embodiment, the MCU of the touchpad MCU is configured to integrate the radar sensor. The distance sensing signal collected by the Radar sensor is calculated to obtain L and a. The touchpad obtains R (Le, r) through calculation by using X and Y of the capacitance sensor. The touchpad dynamically adjusts the working area R' (Le, r) and anti-fault touch area R (Le, r).

Based on the above embodiment, in the embodiment, in the zone mode of the touchpad, the touchpad may dynamically adjust the control interface and the corresponding area based on the user gesture input detected by the radar sensor.

It can be seen that, in the embodiment, the Radar sensor may be integrated and configured to dynamically adjust the method of response of the touchpad by pre-determining the gesture such as the user hand orientation, for example, the determinations of the cursor display and the response zone.

Moreover, in the embodiment, the anti-fault touch function and the user experience may be improved through the non-contact detection. Further, in the embodiment, based on the self-learning algorithm, the touchpad may be dynamically divided into zones to dynamically adjust the response zone of the touchpad, dynamically and smartly switch the control interface, and enhance the product competitiveness.

Various embodiments in the specification are described in a progressive manner. Each embodiment focuses on the differences from other embodiments. Same or similar parts between the various embodiments can be referred to each other. For the device disclosed in embodiments of the present disclosure, since the device corresponds to the method disclosed in embodiments of the present disclosure, the description is relatively simple, and the relevant parts can be referred to the description of the method part.

Those skilled in the art may further realize that the units and algorithm steps of the examples described in the embodiments disclosed in the specification may be implemented by electronic hardware, computer software, or a combination of the two. To clearly illustrate the interchangeability of the hardware and the software, in the above description, the composition and steps of each example have been generally described according to the functions. Whether these functions are executed by hardware or software depends on the specific application and design constraint conditions of the technical solution. Those skilled in the art may use different methods to implement the described functions for each specific application, but such implementation should not be considered beyond the scope of the present disclosure.

The method or algorithm steps described in combination with the embodiments disclosed in the specification may be directly implemented by hardware, a software module executed by a processor, or a combination of the two. The software module may be placed in random access memory (RAM), internal memory, read-only memory (ROM), electrically programmable ROM, electrically erasable programmable ROM, registers, hard disks, removable disks, CD-ROMs, or any other storage media well-known in the technical field.

The above description of the disclosed embodiments enables those skilled in the art to implement or use the present disclosure. Various modifications to these embodiments are obvious to those skilled in the art. The general principles defined in the specification may be implemented in other embodiments without departing from the spirit or scope of the present disclosure. Therefore, the present disclosure will not be limited to the embodiments shown in the specification, but should conform to the widest scope consistent with the principles and novel features disclosed in the specification.

What is claimed is:

1. An electronic apparatus, comprising:
   a first sensor, configured to collect a distance sensing parameter; and
   a second sensor, configured to collect a touch control sensing parameter;
   wherein:
      a touch control sensing area of the second sensor is formed on a first surface of the electronic apparatus and covers a specific area of the first surface of the electronic apparatus;
      the touch control sensing area of the second sensor includes a window having different touch control sensing parameter than other parts of the touch control sensing area;
      the first sensor is arranged at a position of the window;
      the first sensor collects the distance sensing parameter in a space above the touch control sensing area through the window; and
      the second sensor is further configured to determine a method of response of the second sensor in the touch control sensing area based on the distance sensing parameter, the second sensor responding to an input operation in the touch control sensing area.

2. The electronic apparatus according to claim 1, wherein the window is arranged at a middle position of a first edge of the touch control sensing area of the second sensor.

3. The electronic apparatus according to claim 1, further comprising:
   a protection structure laid on a surface of the second sensor and covering the first sensor, the first sensor collecting the distance sensing parameter through the protection structure.

4. The electronic apparatus according to claim 1, further comprising:
   a processor, configured to generate an operation instruction based on the distance sensing parameter and the touch control sensing parameter, and respond to the operation instruction to execute a corresponding function.

5. The electronic apparatus according to claim 4, wherein the processor is further configured to:
   recognize a gesture type of an operating body based on the distance sensing parameter;
   in response to the gesture type being a first type, generate the operation instruction corresponding to the first type;
   in response to the gesture type being a second type, process the touch control parameter with the distance sensing parameter and generate the operation instruction based on a processed touch control sensing parameter.

6. A data processing method, comprising:
   responding to a distance sensing parameter collected by a first sensor, and obtaining a touch control sensing parameter collected by a second sensor, a touch control sensing area of the second sensor being formed on a first surface of the electronic apparatus and covering an area of the first surface of an electronic apparatus, the touch control sensing area of the second sensor including a window having different touch control sensing parameter than other parts of the touch control sensing area, the first sensor being arranged at a position of the window, and the first sensor collecting the distance sensing parameter in a space above the touch control sensing area through the window;
   generating an operation instruction based on the distance sensing parameter and the touch control sensing parameter, including:
      determining a method of response of the second sensor in the touch control sensing area based on the distance sensing parameter, the second sensor responding to an input operation in the touch control sensing area; and
   responding to the operation instruction to execute a corresponding function.

7. The method according to claim 6, wherein:
   generating the operation instruction based on the distance sensing parameter and the touch control sensing parameter includes:
      recognizing a gesture type of an operating body based on the distance sensing parameter;
      in response to the gesture type being a first type, generating the operation instruction corresponding to the first type; and
      in response to the gesture type being a second type, processing the touch control parameter with the distance sensing parameter and generating the operation instruction based on a processed touch control sensing parameter.

8. The method according to claim 7, wherein processing the touch control sensing parameter includes:
   setting a parameter of the touch control sensing parameter corresponding to the position of the window as a target parameter.

9. The method according to claim 8, wherein the target parameter corresponds to a parameter of the touch control sensing parameter corresponding to a position adjacent to the window.

10. A data processing method, comprising:
receiving a first parameter, collected by a first sensor of an electronic apparatus, the first parameter being in a space above a sensing area of a second sensor of the electronic apparatus, the first sensor being different from the second sensor; and
determining a method of response of the second sensor in the sensing area of the second sensor at least based on the first parameter, the second sensor responding to an input operation in the sensing area, the method of response of the second sensor in the sensing area is different for different first parameter collected by the first sensor;
wherein:
the sensing area of the second sensor is formed on a first surface of the electronic apparatus and covers a specific area of the first surface of the electronic apparatus;
the sensing area of the second sensor includes a window having different sensing parameter than other parts of the sensing area;
the first sensor is arranged at a position of the window; and
the first sensor collects the first parameter in the space above the sensing area through the window.

11. The method according to claim 10, wherein determining the method of response of the second sensor in the sensing area of second sensor at least based on the first parameter includes:
determining a response zone in the sensing area based on the first parameter, the second sensor responding to the input operation within the response zone, other areas except the response zone in the sensing area being configured to be irresponsive to the input operation.

12. The method according to claim 11, wherein determining the response zone in the sensing area based on the first parameter includes:
recognizing a position parameter of an operating body in the first parameter;
determining a mapping area where the operating body is mapped to the sensing area based on the position parameter; and
determining the response zone in the sensing area based on the mapping area.

13. The method according to claim 12, wherein determining the response zone in the sensing area based on the mapping area includes:
in response to an area of the mapping area being greater than or equal to a preset threshold, determining the other areas in the sensing area except the mapping area as the response zone, the mapping area being configured to be irresponsive to the input operation; and
in response to the area of the mapping area being smaller than the threshold, based on a distribution position of the mapping area in the sensing area, determining the response zone in the sensing area.

14. The method according to claim 12, wherein determining the response zone in the sensing area based on the mapping area includes:
determining a zone corresponding to the distribution position of the mapping area in the sensing area as the response zone in a plurality of zones of the sensing area, other zones except the response zone in the sensing area being configured to be irresponsive to the input operation.

15. The method according to claim 10, wherein determining the method of response of the second sensor in the sensing area of the second sensor at least based on the first parameter includes:
outputting a response mark in a display area corresponding to the sensing area based on the first parameter, the second sensor responding to the input operation with the response mark.

16. The method according to claim 15, wherein outputting the response mark in the display area corresponding to the sensing area based on the first parameter includes:
recognizing a position parameter of an operating body in the first parameter;
determining a mapping area of the operating body where the operating body is mapped to the sensing area based on the position parameter; and
outputting the response mark in the corresponding display area based on the mapping area.

17. The method according to claim 16, wherein outputting the response mark in the corresponding display area based on the mapping area includes:
determining the display area associated to the mapping area; and
outputting the response mark in the display area, the display area being associated to a position of the mapping area in the sensing area.

18. The method according to claim 10, wherein determining the method of response of the second sensor in the sensing area of second sensor at least based on the first parameter further includes:
determining a response zone in the sensing area based on the first parameter; and
determining whether a display area is on a local monitor of the electronic apparatus or on an external monitor according to a location of the response zone in the sensing area of the second sensor.

19. The electronic apparatus according to claim 1, wherein the window is surrounded by the other parts of the touch control sensing area.

* * * * *